United States Patent [19]

Nations

[11] 3,709,527
[45] Jan. 9, 1973

[54] SEPTIC TANK INLET AND OUTLET FITTINGS

[75] Inventor: Robert L. Nations, Beaverton, Oreg.

[73] Assignee: Rich Manufacturing Company of Oregon, Portland, Oreg.

[22] Filed: April 7, 1971

[21] Appl. No.: 132,087

[52] U.S. Cl. .................... 285/110, 285/61, 285/156, 285/158
[51] Int. Cl. ........................... F16l 3/00, F16l 5/02
[58] Field of Search .......... 285/156, 158, 110, 61, 64, 285/192, 231; 220/1 B, 5 B

[56] References Cited

UNITED STATES PATENTS

| 1,471,154 | 10/1923 | Graham | 285/61 X |
|---|---|---|---|
| 2,272,812 | 2/1942 | Neal | 285/231 X |
| 1,994,226 | 3/1935 | Martocello | 285/61 X |
| 1,039,013 | 9/1912 | Berryman | 285/156 X |
| 2,895,560 | 7/1959 | Lynn | 285/156 X |
| 1,117,250 | 11/1914 | Rothe | 285/192 X |
| 987,807 | 3/1911 | Lonskey | 285/61 X |

Primary Examiner—Thomas F. Callaghan
Attorney—Lee R. Schermerhorn

[57] ABSTRACT

The inlet and outlet fittings are of similar but not identical cast-iron construction to enable certain parts of the patterns and cores to be used interchangeably with other parts for casting the two types of fittings. Each fitting is a tee having a horizontal bell mouth portion adapted to receive the end of an exterior pipe and upwardly and downwardly extending vertical portions. Each downwardly extending portion has a brace leg bearing against the tank wall and an open lower end. The upper end of the inlet fitting is closed to prevent back flow of gas from the septic tank into the house while the upper end of the outlet fitting is open to prevent syphoning.

3 Claims, 3 Drawing Figures

PATENTED JAN 9 1973

3,709,527

INVENTOR
ROBERT L. NATIONS
BY
Lee N. Schermerhorn
Attorney

SEPTIC TANK INLET AND OUTLET FITTINGS

BACKGROUND OF THE INVENTION

This invention relates to improved inlet and outlet fittings for a septic tank.

The conventional baffles used at the inlet and outlet of septic tanks are subject to premature failure with two undesirable results. At the inlet, gases from the pollutant held in the tank are then able to back flow up the drain line into the house vent. Also, without the baffles there is a possibility of raw sewage flowing straight through the tank from inlet to outlet without the intended delay for treatment.

Objects of the invention are, therefore, to provide improved inlet and outlet fittings which overcome the objections pointed out above, to provide inlet and outlet fittings which are more durable and not subject to premature failure, to provide inlet and outlet fittings which obviate the necessity for separate baffles in the tank, to provide an inexpensive form of construction for such fittings, and to provide a form of casting which permits certain parts of the patterns and cores to be used interchangeably for casting both inlet and outlet fittings.

SUMMARY OF THE INVENTION

In the new form of construction the inlet and outlet fittings are made as similar but not identical cast-iron tees. A vertical tubular portion is equipped with an outstanding leg near its lower end to bear against the tank. The upper end of the inlet fitting is closed to prevent escape of gas from the septic tank back through the inlet pipe, and the upper end of the outlet fitting is open to prevent syphoning.

Each fitting is mounted on a side of the tank near the top by means of a horizontal bell mouth portion containing a gasket which seals the connection between the fitting and the associated external pipe. The similarity of the two fittings allows them to be cast economically with interchangeable pattern and core parts.

The invention will be better understood and additional objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention.

DESCRIPTION OF THE PREFERRED EMBODIMENT

Figure 1:
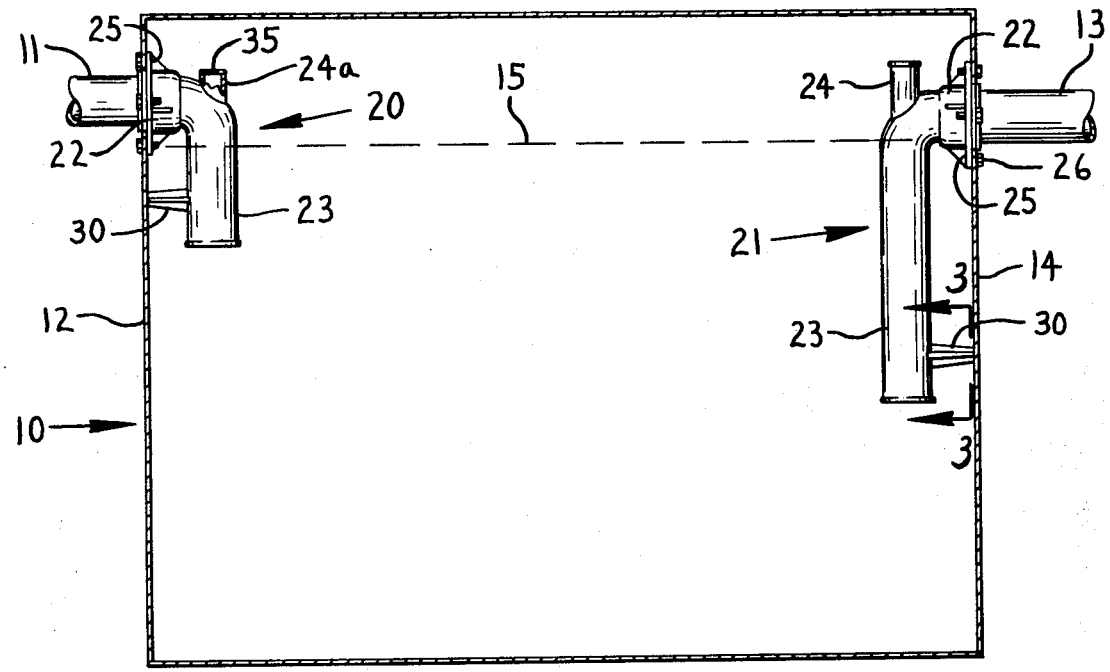
FIG. 1 is a vertical sectional view of a septic tank having inlet and outlet fittings embodying the invention.
Figure 2:
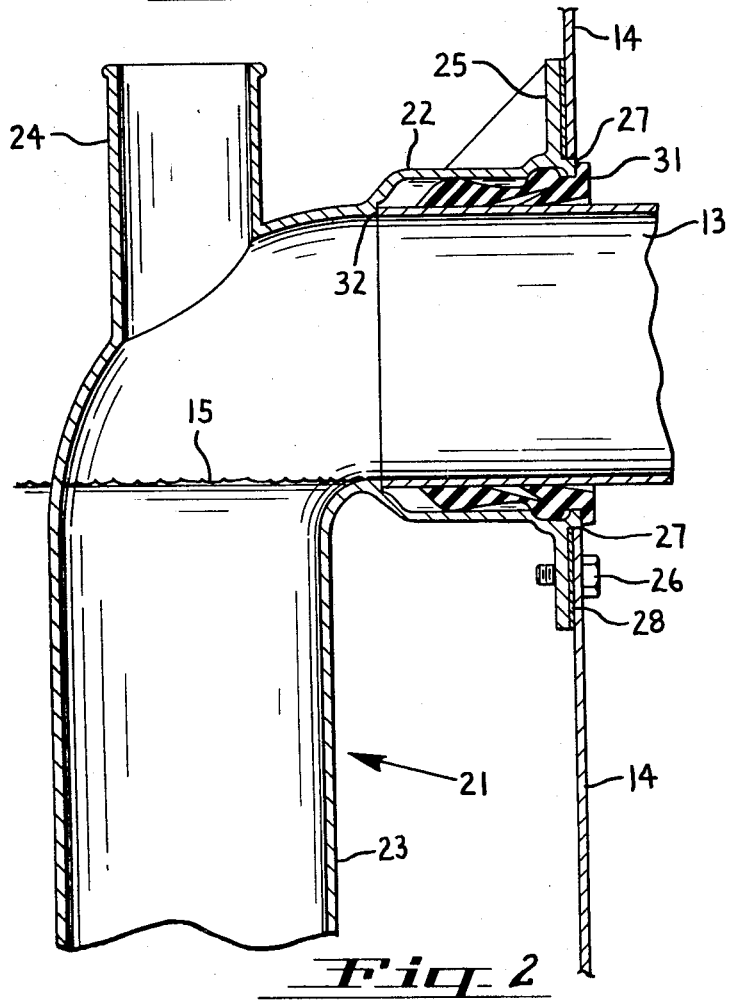
FIG. 2 is a fragmentary enlarged vertical sectional view of the outlet fitting in FIG. 1.
Figure 3:
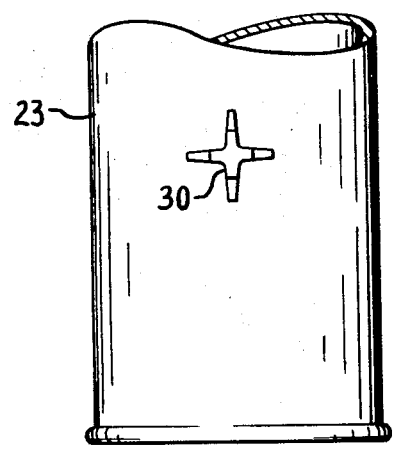
FIG. 3 is a view on the line 3—3 in FIG. 1.

By way of example, FIG. 1 shows a conventional form of metal septic tank 10 having an external inlet pipe connection 11 through a vertical wall 12 and an external outlet pipe connection 13 at approximately the same level in the opposite vertical wall 14. The normal liquid level in the tank is indicated at 15.

External inlet pipe 11 communicates with an internal inlet fitting 20 and external outlet pipe 13 communicates with an internal outlet fitting 21. In order to simplify the construction and reduce the cost of manufacture, the inlet and outlet fittings 20 and 21 are of similar though not identical construction.

Each fitting is made in the form of a tee having a horizontal bell mouth portion 22, a large downwardly extending tubular portion 23 and a smaller upwardly extending tubular portion 24 or 24a. Bell mouth portion 22 is equipped with an integral bolting flange 25 which is secured to the tank wall by a plurality of screws 26 around an opening at 27 in the tank wall. This joint is sealed by an annular gasket 28.

The fittings 20 and 21 are of fairly heavy cast-iron construction and are installed at the factory during the manufacture of the tank. When the tank leaves the factory it is completely closed as shown, making the fittings 20 and 21 inaccessible thereafter. The tank may be subject to rough handling during delivery and placement in its excavation in the ground. In order to prevent damage to the parts during handling and placement in the excavation, the downwardly extending tubular portion 23 is provided with a horizontally extending integral leg 30 which is arranged to bear against the tank wall as shown and provide a brace for the lower part of the fitting which is at some distance from its supporting flange 25.

Bell mouth portion 22 is equipped with a resilient rubber sealing ring 31 which forms a seal between the internal fittings 20 and 21 and the external pipes 11 and 13. With this arrangement it is not necessary to provide a positive mechanical connection between the tank and external pipes 11 and 13. When the tank has been properly placed in its excavation, it is only necessary to push the ends of the external pipes through the sealing rings 31 until they seat against internal shoulders 32 as shown.

The inlet and outlet fittings 20 and 21 are different from each other only in the lengths of the downwardly extending tubular portions 23 and in the upwardly extending tubular portions 24 and 24a. In both fittings the lower ends of the downwardly extending tubular portions 23 are open.

The short portion 23 of inlet fitting 20 introduces the incoming sewage at an upper level in the tank while the longer portion 23 of outlet fitting 21 discharges material from a lower level in the opposite side of the tank in order to prevent straight through flow without adequate delay for treatment in the tank.

The upwardly extending tubular portion 24 of outlet fitting 21 projects a distance above the bell mouth portion 22 and is open to prevent syphoning. On the other hand, the upwardly extending portion 24a of inlet fitting 20 is shorter and is closed at 35 by an integral end wall in the casting to prevent back flow of gases from the septic tank through pipe 11 to the house vent pipe.

Septic tanks are usually made in cylindrical configuration having a cylindrical wall and two flat end walls. When the tank is placed in horizontal position, the fittings 20 and 21 have flat flanges 25 for mounting on the opposite flat end walls of the tank. When the tank is placed in vertical position, the flanges 25 are curved to conform to the curvature of the cylindrical side wall. Flanges 25 and legs 30 are omitted in fittings used in concrete tanks.

Thus, the similarity of the two fittings 20 and 21 allows them to be cast economically in a single mold with interchangeable pattern and core parts. The castings are designed for a useful life equal to that of a metal tank whereby gas or liquid pollution of the environment from premature failure of the inlet and outlet fittings is prevented.

Having now described my invention and in what manner the same may be used, what I claim as new and desire to protect by Letters Patent is:

1. A septic tank having a vertical wall with an opening therein, a one-piece metal tee casting having a horizontal bell mouth portion with a bolting flange, screws inserted through said wall from the outside thereof, securing said bolting flange on the inside of the wall concentric with said opening, said bolting flange supporting said casting in the tank, a resilient rubber sealing ring in said bell mouth portion arranged to receive an end of an outside pipe inserted into said bell mouth portion through said opening, vertical tubular portions extending downwardly and upwardly from said bell mouth portion, and an integral horizontal leg on said downwardly extending vertical tubular portion bearing against the inside of said wall.

2. A septic tank as defined in claim 1, said upwardly extending vertical tubular portion having a closed upper end for use of said casting as an inlet fitting.

3. A septic tank as defined in claim 1, said upwardly extending vertical tubular portion having an open upper end for use of said casting as an outlet fitting.

* * * * *